(12) United States Patent
Hammer et al.

(10) Patent No.: US 10,682,823 B2
(45) Date of Patent: Jun. 16, 2020

(54) SELF-HEALING METAL COMPOSITE TUBE WALLS

(71) Applicant: Hyperloop Technologies, Inc., Los Angeles, CA (US)

(72) Inventors: Kristen Hammer, Redondo Beach, CA (US); Blake Cole, Redondo Beach, CA (US)

(73) Assignee: HYPERLOOP TECHNOLOGIES, INC., Los Angeles, CA (US)

( * ) Notice: Subject to any disclaimer, the term of this patent is extended or adjusted under 35 U.S.C. 154(b) by 286 days.

(21) Appl. No.: 15/639,190

(22) Filed: Jun. 30, 2017

(65) Prior Publication Data

US 2018/0009180 A1    Jan. 11, 2018

Related U.S. Application Data

(60) Provisional application No. 62/358,696, filed on Jul. 6, 2016.

(51) Int. Cl.
| | | |
|---|---|---|
| *B29C 73/16* | (2006.01) | |
| *B32B 3/26* | (2006.01) | |
| *C08K 3/00* | (2018.01) | |
| *F28F 1/00* | (2006.01) | |
| *C08K 3/013* | (2018.01) | |
| *B29C 73/22* | (2006.01) | |

(52) U.S. Cl.
CPC ............ *B29C 73/163* (2013.01); *B29C 73/22* (2013.01); *B32B 3/26* (2013.01); *C08K 3/013* (2018.01); *F28F 1/003* (2013.01)

(58) Field of Classification Search
CPC ......... B29C 73/163; B29C 73/22; B32B 3/26; F28F 1/003; C08K 3/0033; C08K 3/013
See application file for complete search history.

(56) References Cited

U.S. PATENT DOCUMENTS

| | | | |
|---|---|---|---|
| 3,830,261 A | 8/1974 | Hochberg et al. | |
| 7,612,152 B2 | 11/2009 | Braun et al. | |
| 2007/0093158 A1 | 4/2007 | Dudt et al. | |
| 2013/0196071 A1* | 8/2013 | Yang | C09D 7/70 427/386 |

FOREIGN PATENT DOCUMENTS

CN        103486361        1/2014

OTHER PUBLICATIONS

International Search Report and Written Opinion in WIPO counterpart application No. PCT/US17/40372, dated Dec. 21, 2017.

* cited by examiner

*Primary Examiner* — Yan Lan
(74) *Attorney, Agent, or Firm* — Greenblum & Bernstein, P.L.C.

(57) ABSTRACT

A tubular structure including an outer tube an inner tube arranged within the outer tube and at least one chamber formed between the outer tube and the inner tube. The tubular structure additionally includes at least one self-healing material arranged in the chamber, wherein the self-healing material is configured to solidify and/or expand upon contact with a reacting material.

16 Claims, 12 Drawing Sheets

SELF-HEALING METAL COMPOSITE TUBE WALLS

CROSS-REFERENCE TO RELATED APPLICATION

The present application claims the benefit of U.S. Provisional Application No. 62/358,696, filed Jul. 6, 2016, the contents of which are expressly incorporated herein by reference in their entirety.

BACKGROUND OF THE DISCLOSURE

1. Field of the Disclosure

The present disclosure relates to the repairing of small holes within an enclosed structure without human intervention, and more specifically, to self-healing metal composite tube walls.

2. Background of the Disclosure

A transportation system used to transport an object may comprise a tubular structure. One method of constructing such a tubular structure is to weld an inner tube to an outer tube, thus creating an enclosed chamber that acts as a buffer between an outer, uncontrolled environment that the outer tube is subject to and an inner, controlled environment that the inner tube maintains. A problem that arises with this structural design is responding to a puncture in the outer tube. A puncture can be especially problematic if the hole also pierces the inner tube and threatens the inner, controlled environment.

Additionally, when exposed for long times to high temperatures and moderate stresses, metals may exhibit premature and low-ductility creep fracture, arising from the formation and growth of cavities. Those defects may coalesce into cracks which ultimately cause macroscopic failure.

In general, cracks or punctures may be hard to detect at an early stage, and manual intervention is required for periodic inspections and repairs, which can incur large costs. For example, upon detecting a hole, the hole may be remedied by manual repair. On site manual repair, however, may be too costly, and depending on the location of the tube, may be too dangerous. Additionally, such a manual repair may require shutting down the transportation system (or portions thereof) at great cost.

Therefore, there is a need in the art for an approach to quickly patch a leak in such a tubular double wall structure without requiring manual intervention or action (at least until further maintenance can be performed).

SUMMARY OF THE EMBODIMENTS OF THE DISCLOSURE

The novel features which are characteristic of the disclosure, both as to structure and method of operation thereof, together with further aims and advantages thereof, will be understood from the following description, considered in connection with the accompanying drawings, in which the preferred embodiment of the disclosure is illustrated by way of example. It is to be expressly understood, however, that the drawings are for the purpose of illustration and description only, and they are not intended as a definition of the limits of the disclosure.

Aspects of the present disclosure are directed to a tubular structure comprising: an outer tube; an inner tube arranged within the outer tube; at least one chamber formed between the outer tube and the inner tube; and at least one self-healing material arranged in the chamber, wherein the self-healing material is configured to solidify and/or expand upon contact with a reacting material.

In embodiments, the tubular structure further comprises at least two chamber separators, wherein the at least one chamber comprises a plurality of chambers formed by the at least two chamber separators.

In some embodiments, wherein the chamber separators extend in a radial direction between the inner tube and the outer tube and extend longitudinally along the inner tube.

In additional embodiments, the chamber separators extend in a radial direction between the inner tube and the outer tube and extend circumferentially along the inner tube.

In further embodiments, the at least one self-healing material is arranged in discrete portions in each of the plurality of chambers.

In embodiments, the reacting material is at least one foreign fluid.

In some embodiments, the at least one self-healing material comprises first and second self-healing materials, wherein the first self-healing material is configured to solidify upon contact with a first foreign fluid, and the second self-healing materials is configured to solidify upon contact with a second foreign fluid.

In additional embodiments, the first foreign fluid is external to the outer tube, and wherein the second foreign fluid is internal to the inner tube.

In further embodiments, the reacting material is arranged in proximity to the self-healing material, while being maintained isolated from the self-healing material by an isolating material.

In some embodiments, the isolating material is operable to dissolve, degrade, disintegrate, and/or breakdown upon contact with a foreign fluid.

In embodiments, the inner tube is concentrically arranged within the outer tube.

In additional embodiments, the at least one self-healing material is structured and arranged to be contacted with a foreign fluid entering the at least one chamber through a hole formed in a wall of the outer tube, and upon the solidification and/or expansion of the self-healing material, forms a solidified section that seals the hole.

In further embodiments, the at least one self-healing material is configured such that the solidified section formed therefrom expands to contact both the outer tube and the inner tube.

In embodiments, the at least one self-healing material is configured such that a solidified section formed therefrom expands to contact both the outer tube and the inner tube and a plurality of chamber separators.

In some embodiments, the self-healing material is encapsulated in an enclosing material.

In additional embodiments, the at least one self-healing material is structured and arranged to be contacted with a foreign fluid entering the at least one chamber through a hole formed in a wall of the inner tube, and upon the solidification and/or expansion of the self-healing material, forms a solidified section that seals the hole.

In embodiments, the self-healing material comprises at least one of polymers, elastomers, metals, ceramics, cementitious materials, and grout materials.

Additional aspects of the present disclosure are directed to a method of forming a tubular structure comprising an outer tube, an inner tube arranged within the outer tube, and at least one chamber formed between the outer tube and the inner tube. The method comprises forming the at least one chamber and arranging at least one self-healing material in the at least one chamber, wherein the self-healing material is configured to solidify and/or expand upon contact with a reacting material.

Further aspects of the present disclosure are directed to a method of sealing a hole in a tubular structure comprising an outer tube, an inner tube arranged within the outer tube, at least one chamber formed between the outer tube and the inner tube, and at least one self-healing material arranged in the at least one chamber, wherein the self-healing material is configured to solidify and/or expand upon contact with a reacting material. The method comprises contacting the self-healing material with the reacting material such that the self-healing material solidifies and/or expands to form a solidified section and sealing the hole with the solidified section.

In embodiments, the contacting the self-healing material with the reacting material occurs by the reacting material flowing through the hole.

In some embodiments, the contacting the self-healing material with the reacting material comprises: a foreign fluid entering the at least one chamber through the hole; and dissolving, degrading, disintegrating, and/or breaking down a isolating material arranged between the self-healing material and the reacting material using the foreign fluid entering through the hole so that the self-healing material interacts with the reacting material.

In additional embodiments, the hole is formed in the outer tube.

In further embodiments, the hole is formed in the inner tube.

The present disclosure is related to a system that utilizes sealing (or healing) materials, reactive to the presence or lack of presence of a specific fluid/material, such as water or air. In embodiments, the material can also be modified (or selected) depending on the outer environment (e.g., desert vs. arctic environment). In embodiments, the sealing (or healing) materials may be air-curing and/or water-curing epoxies, polymers, gels, concretes, grouts and/or rubbers. Other exemplary sealing (or healing) materials include sealing materials used in quick-application sealants for bike tubes.

By implementing aspects of the disclosure, repairs to the tube structure may be achieved remotely without manual intervention and without the costs involved with manual repair. Additionally, by implementing aspects of the disclosure, utilizing a material that can intrinsically correct damage caused by e.g., normal usage may prevent costs incurred by material failure and/or lower costs of a number of different industrial processes through longer part lifetime, and reduction of inefficiency caused by degradation over time. Thus, in accordance with aspects of the disclosure, self-healing of early stage damage is thus a promising approach to extend the lifetime of the metallic components.

BRIEF DESCRIPTION OF THE DRAWINGS

These and other features of this disclosure will be best understood by reference to the following detailed description of embodiments of the disclosure, taken in conjunction with the accompanying drawings, in which.

DETAILED DESCRIPTION OF THE EMBODIMENTS OF THE DISCLOSURE

In the following description, the various embodiments of the present disclosure will be described with respect to the enclosed drawings. As required, detailed embodiments of the embodiments of the present disclosure are discussed herein; however, it is to be understood that the disclosed embodiments are merely exemplary of the embodiments of the disclosure that may be embodied in various and alternative forms. The figures are not necessarily to scale and some features may be exaggerated or minimized to show details of particular components. Therefore, specific structural and functional details disclosed herein are not to be interpreted as limiting, but merely as a representative basis for teaching one skilled in the art to variously employ the present disclosure.

The particulars shown herein are by way of example and for purposes of illustrative discussion of the embodiments of the present disclosure only and are presented in the cause of providing what is believed to be the most useful and readily understood description of the principles and conceptual aspects of the present disclosure. In this regard, no attempt may be made to show structural details of the present disclosure in more detail than is necessary for the fundamental understanding of the present disclosure, such that the description, taken with the drawings, making apparent to those skilled in the art how the forms of the present disclosure may be embodied in practice.

As used herein, the singular forms "a," "an," and "the" include the plural reference unless the context clearly dictates otherwise. For example, as used herein, the indefinite article "a" indicates one as well as more than one and does not necessarily limit its referent noun to the singular. Thus, for example, reference to "a magnetic material" would also indicate that mixtures of one or more magnetic materials can be present unless specifically excluded.

Except where otherwise indicated, all numbers expressing quantities used in the specification and claims are to be understood as being modified in all instances by the term "about." Accordingly, unless indicated to the contrary, the numerical parameters set forth in the specification and claims are approximations that may vary depending upon the desired properties sought to be obtained by embodiments of the present disclosure. At the very least, and not to be considered as an attempt to limit the application of the doctrine of equivalents to the scope of the claims, each numerical parameter should be construed in light of the number of significant digits and ordinary rounding conventions.

Additionally, the recitation of numerical ranges within this specification is considered to be a disclosure of all numerical values and ranges within that range (unless otherwise explicitly indicated). For example, if a range is from about 1 to about 50, it is deemed to include, for example, 1, 7, 34, 46.1, 23.7, or any other value or range within the range.

As used herein, the terms "about" and "approximately" indicate that the amount or value in question may be the specific value designated or some other value in its neighborhood. Generally, the terms "about" and "approximately" denoting a certain value is intended to denote a range within ±5% of the value. As one example, the phrase "about 100" denotes a range of 100±5, i.e. the range from 95 to 105. Generally, when the terms "about" and "approximately" are used, it can be expected that similar results or effects according to the disclosure can be obtained within a range of ±5% of the indicated value.

The term "at least partially" is intended to denote that the following property is fulfilled to a certain extent or completely.

The terms "substantially" and "essentially" are used to denote that the following feature, property or parameter is either completely (entirely) realized or satisfied or to a major degree that does not adversely affect the intended result.

The term "substantially parallel" refers to deviating less than 20° from parallel alignment and the term "substantially perpendicular" refers to deviating less than 20° from perpendicular alignment. The term "parallel" refers to deviating less than 5° from mathematically exact parallel alignment. Similarly "perpendicular" refers to deviating less than 5° from mathematically exact perpendicular alignment.

The term "comprising" as used herein is intended to be non-exclusive and open-ended. Thus, for instance a composition comprising a compound A may include other compounds besides A. However, the term "comprising" also covers the more restrictive meanings of "consisting essentially of" and "consisting of," so that for instance "a composition comprising a compound A" may also (essentially) consist of the compound A.

As used herein, the term "and/or" indicates that either all or only one of the elements of said group may be present. For example, "A and/or B" shall mean "only A, or only B, or both A and B". In the case of "only A", the term also covers the possibility that B is absent, i.e. "only A, but not B."

The various embodiments disclosed herein can be used separately and in various combinations unless specifically stated to the contrary.

Embodiments of the present disclosure may be used in a transportation system, for example, as described in commonly-assigned application Ser. No. 15/007,783, entitled "Transportation System," the contents of which are hereby expressly incorporated by reference herein in their entirety.

Additionally, embodiments of the present disclosure may utilize a tube construction, for example, as described in commonly-assigned application Ser. No. 15/374,230, entitled "Method and System for Forming Laser Beam Weld Lap-Penetration Joints," the contents of which are hereby expressly incorporated by reference herein in their entirety.

Figure 1:
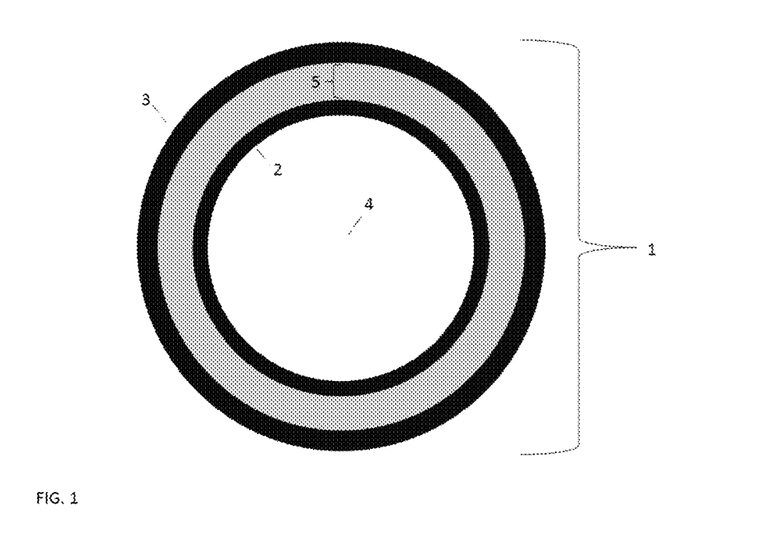
FIG. 1 shows an exemplary tube structure in accordance with aspects of the disclosure.

FIG. 1 shows an exemplary tube structure 1 in accordance with aspects of the disclosure. With this exemplary embodiment, the tube structure 1 comprises an inner tube 2 and an outer tube 3. In embodiments, the inner tube 2 and the outer tube 3 may comprise metal (e.g., steel). In embodiments, the tube 2 and tube 3 may be welded together (e.g., via radially extending connections welded between tube 2 and tube 3). In other contemplated embodiments, the tubes can be joined without welds (e.g., joined with adhesives, fasteners, etc.). Arranged between the inner tube 2 and the outer tube 3 is an enclosed chamber 5. The outer shell (or surface) of the outer tube 3 is exposed to an uncontrolled environment. Depending upon where the tube structured 1 is situated, in embodiments, the uncontrolled environment may include, for example, ambient air, an underwater salt water environment, or an underwater fresh water environment, amongst other contemplated environments. The inner shell (or surface) of the inner tube 2 is exposed to a controlled environment 4 (e.g., a low-pressure or vacuum environment). The enclosed chamber 5 has an internal environment therein.

In accordance with aspects of the disclosure, one purpose of this double-wall structure having the enclosed chamber 5 is to prevent the controlled environment 4 from coming into contact with the uncontrolled environment and to keep the internal environment within the chamber 5 from coming into contact with either of the controlled environment 4 or the uncontrolled environment.

Figure 2:
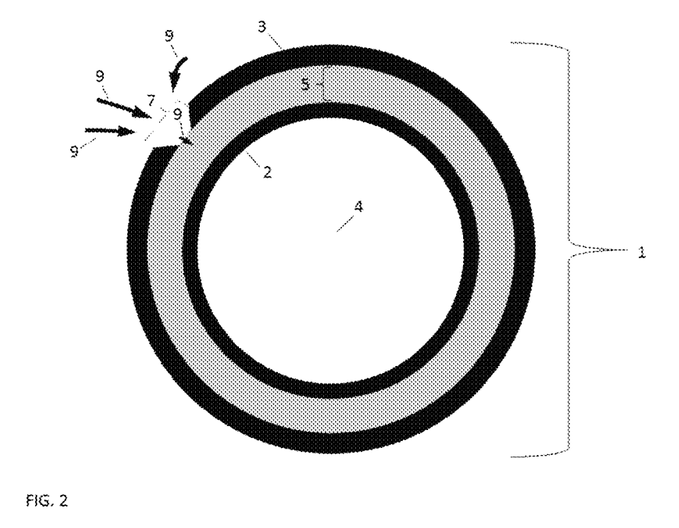
FIG. 2 shows a hole in the tube structure with a fluid entering a chamber of the tube structure in accordance with aspects of the disclosure.

FIG. 2 shows the tube structure 1 with a hole 7 formed in the outer tube 3. For example, the hole 7 may be caused by a projectile (e.g., a bullet) striking the outer tube 3. With this exemplary embodiment, the tube structure 1 is arranged in an uncontrolled environment of fluid 9 (e.g., seawater). As shown in FIG. 2, the hole 7 in the outer tube 3 exposes the chamber 5 to the uncontrolled environment comprising a fluid 9. Due to the relatively higher pressure of the uncontrolled environment (as compared to the lower pressure of the chamber 5), fluid 9 enters the chamber 5 through the outer hole 7. Such a situation may negatively impact the tube structure 1. For example, having fluid enter the chamber 5 may impact the buoyancy characteristics of the tube structure 1 and/or impact the weight distribution of the tube structure 1.

Figure 3:
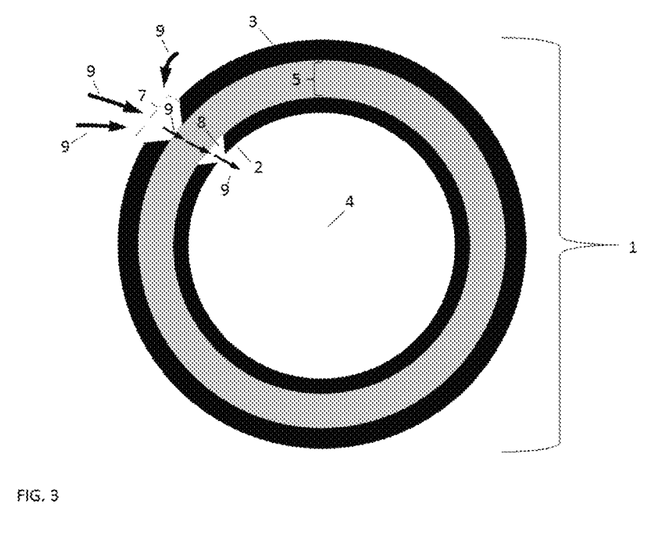
FIG. 3 shows the hole in the tube structure extending completely through the tube structure in accordance with aspects of the disclosure.

FIG. 3 shows the tube structure 1 with both a hole 7 in the outer tube 3 and a hole 8 in the inner tube 2. With such a defect, the fluid 9 travels from the outer, uncontrolled environment, through hole 7, then through the chamber 5 and the inner hole 8 into the controlled environment 4. That is, due to the relatively higher pressure of the uncontrolled environment (as compared to the lower pressure of the chamber 5), fluid 9 enters the chamber 5 through hole 7. Due to the relatively higher pressure of the chamber 5 (as compared to the lower pressure of the controlled environment 4), fluid 9 enters the controlled environment 4 through hole 8. Such a situation may negatively impact the tube structure 1. For example, in addition to the negative impacts of the fluid in chamber 5, discussed above, with hole 8, the fluid 9 would enter into the controlled environment 4 impacting the ability for the controlled environment 4 to allow for passage of a transportation vehicle.

Figure 4:
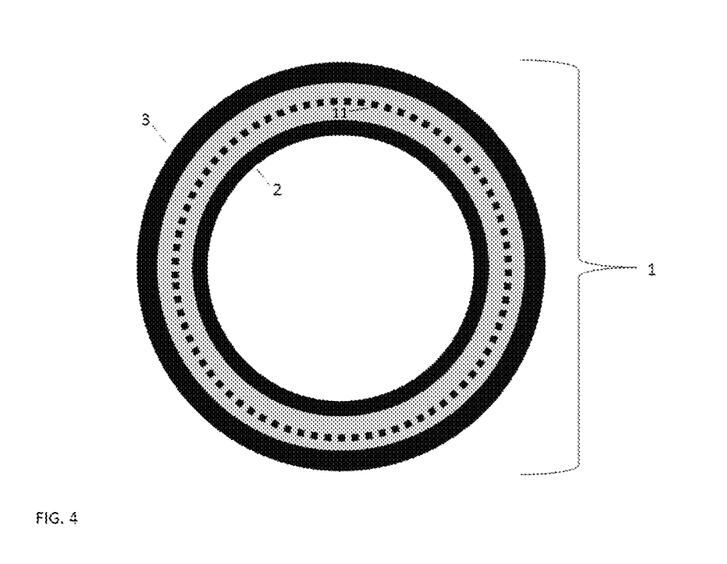
FIG. 4 shows the tube structure with a self-healing material in accordance with aspects of the disclosure.

FIG. 4 shows how the tube structure 1 may further comprise a self-healing material (SHM) 11 located within the chamber 5 between the inner tube 2 and the outer tube 3 in accordance with aspects of the disclosure. In embodiments, self-healing materials may include artificial or synthetically-created substances that possess the ability to automatically repair damage to themselves (or adjacent materials) without any external diagnosis of the problem or human intervention.

As noted, materials of the tube wall may be purposefully damaged (e.g., bullet holes), accidentally damaged, and/or may degrade over time due to, e.g., fatigue, environmental conditions, or damage incurred during operation. Cracks and other types of damage on a microscopic level have been shown to change thermal, electrical, and acoustical properties of materials, and the propagation of cracks can lead to eventual failure of the material. If the material of the outer tube wall or inner tube wall fails, the tube structure or the transportation system utilizing the tube structure may likewise fail.

In general, cracks may be hard to detect at an early stage, and manual intervention may be required for periodic inspections and repairs. In contrast, self-healing materials counter degradation through the initiation of a repair mechanism that responds to damage (e.g., micro-damage). Some self-healing materials are classified as smart structures, which can adapt to various environmental conditions according to their sensing and/or actuation properties.

Although the most common types of self-healing materials are polymers or elastomers, self-healing covers all classes of materials, including metals, ceramics, cementitious materials, and grout materials.

The healing mechanisms of self-healing materials can vary from an intrinsic repair of the material to the addition of a repair agent contained in, e.g., in a vessel, such as a microscopic vessel. For a material to be strictly defined as autonomously self-healing, the healing process should occur without human intervention. Self-healing polymers may, however, activate in response to an external stimulus (fluid contact, pressure change, temperature change, etc.) to initiate the healing process.

Polymer materials can be divided into two different groups based on the approach to the self-healing mechanism: intrinsic or extrinsic. Autonomous self-healing polymers may follow a three-step process. In the event of damage, the first response is triggering or actuation, which happens almost immediately after damage is sustained. The second response is transport of materials to the affected area, which also happens very quickly. The third response is the chemical repair process. This process differs depending on the type of healing mechanism that is in place (e.g., polymerization, entanglement, reversible cross-linking). These self-healing materials can be classified in three different ways: capsule-based, vascular, and intrinsic. While similar in some ways, these three ways differ in the ways that response is hidden or prevented until actual damage is sustained.

In intrinsic systems, the healing material is able to restore its integrity. While extrinsic approaches are generally autonomous, intrinsic systems often require an external trigger for the healing to take place (such as thermomechanical, electrical, photo-stimuli, etc.). One strategy achieves the self-healing in thermoset matrices by incorporating meltable thermoplastic additives. A temperature trigger allows the re-dispersion of thermoplastic additives into cracks, giving rise to mechanical interlocking.

In extrinsic systems, the healing chemistries are separated from the surrounding polymer in, for example, microcapsules or vascular networks, which after material damage/cracking release their content into the crack plane, reacting and allowing the restoration of material functionalities. These systems can be further subdivided in several categories. While capsule-based polymers sequester the healing agents in little capsules that only release the agents if they are ruptured, vascular self-healing materials sequester the healing agent in capillary-type hollow channels, which can be interconnected one dimensionally, two dimensionally, or three dimensionally. After one of these capillaries is damaged, the network can be refilled by an outside source or another channel that was not damaged.

Methods for the implementation of self-healing functionality into filled composites and fiber-reinforced polymers (FRPs) can be broadly classified into two approaches; discrete capsule-based systems and continuous vascular systems.

In embodiments, the self-healing material may be in the form of a coating. Coatings allow the retention and improvement of bulk properties of a material. They can provide protection for a substrate from environmental exposure. Thus, when damage occurs (often in the form of microcracks), environmental elements like water and oxygen can diffuse through the coating and may cause material damage or failure. Micro-cracking in coatings can result in mechanical degradation or delamination of the coating, or in electrical failure in fiber-reinforced composites and microelectronics, respectively. As the damage is on such a small scale, repair, if possible, is often difficult and costly. Therefore, a coating that can automatically heal itself ("self-healing coating") could prove beneficial by automatic recovering properties (such as mechanical, electrical and aesthetic properties), and thus extending the lifetime of the coating. In embodiments, self-healing materials can be applied to make "self-healing" coatings, including, for example, microencapsulation and the introduction of reversible physical bonds such as hydrogen bonding, ionomers and chemical bonds (Diels-Alder chemistry). Microencapsulation is the most common method to develop self-healing coatings. By using the aforementioned materials for self-healing in coatings, it was proven that microencapsulation effectively protects the metal against corrosion and extends the lifetime of a coating.

In embodiments, the self-healing material may be in the form of a cementitious material. Cementitious materials have a natural ability to self-heal, which can be improved by the integration of chemical and biochemical strategies. Autogenous healing is the natural ability of cementitious materials to repair cracks. This ability is principally attributed to further hydration of un-hydrated cement particles and carbonation of dissolved calcium hydroxide. Cementitious materials in fresh-water systems can autogeneously heal cracks up to 0.2 mm over a period of 7 weeks. Self-healing of cementitious materials can be achieved through the reaction of certain chemical agents. Two main strategies exist for housing these agents, namely capsules and vascular tubes. These capsules and vascular tubes, once ruptured, release these agents and heal the crack damage. The self-healing ability of concrete has been improved by the incorporation of bacteria, which can induce calcium carbonate precipitation through their metabolic activity.

Figure 5:
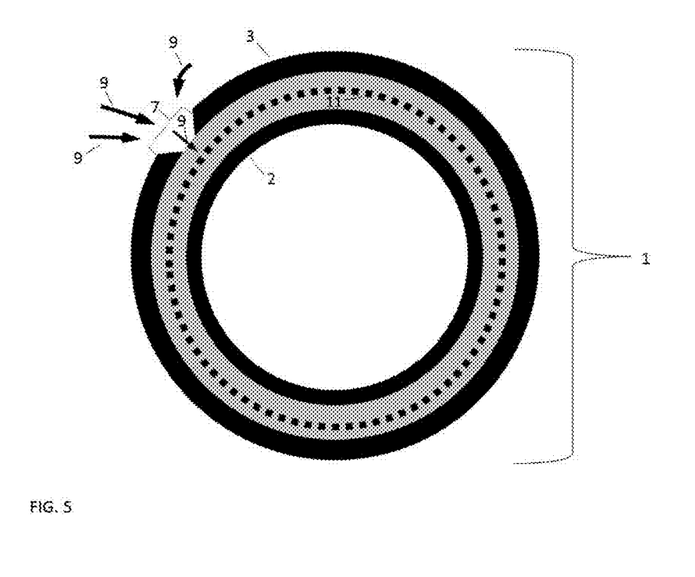
FIG. 5 shows the fluid entering the chamber through the hole and contacting the self-healing material in accordance with aspects of the disclosure.

FIG. 5 shows the tube structure 1 with the hole 7 in the outer tube 3 in accordance with aspects of the disclosure. As shown in FIG. 5, once the hole 7 is formed, the fluid 9 enters the chamber 5 and comes into contact with the SHM 11. That is, the SHM 11 is arranged within the chamber 5 (e.g., when the tube structure 1 is manufactured or assembled). In embodiments, the SHM 11 may be arranged discretely or in a continuous manner within the chamber 5. In embodiments, the SHM 11 may be encapsulated in an encapsulating material (not shown). As should be understood, depending upon where the tube structure 1 is located, the fluid 9 may be a liquid (e.g., seawater) or a gas (e.g., ambient air). In some embodiments, the SHM 11 may be arranged only in portions of the tubular structure (for example, some portions of a tubular structure that may be more susceptible to hole formation).

Figure 6:
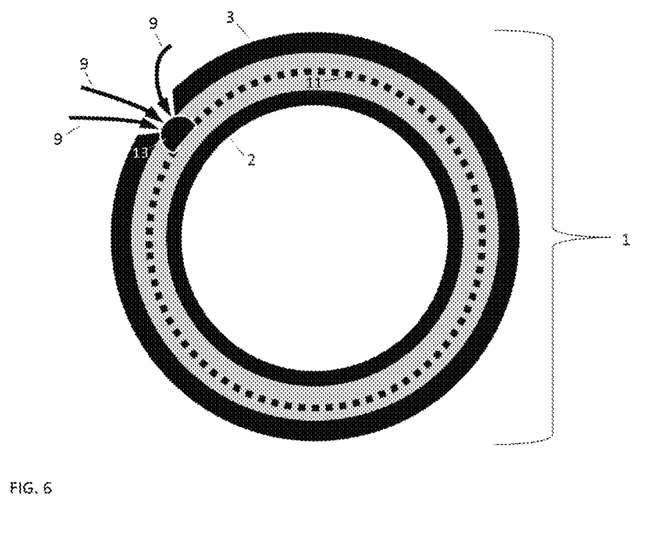
FIG. 6 shows the sealing (or hole-repairing) material solidifying upon contacting the fluid in accordance with aspects of the disclosure.

FIG. 6 shows the tube structure 1 after the fluid 9 has come into contact with the SHM 11 in accordance with aspects of the disclosure. As shown in FIG. 6, with this exemplary and non-limiting embodiment, in those regions where the fluid 9 contacts the SHM 11, the SHM 11 reacts to form a first solidified section (or SS) 13. In accordance with aspects of the disclosure, the first SS 13 is operable to conform to the inner surface of the outer tube 3 and fill in the hole 7, creating a seal (e.g., a vacuum-tight seal) in the hole 7, and thus repair the hole (at least temporarily).

Figure 7:
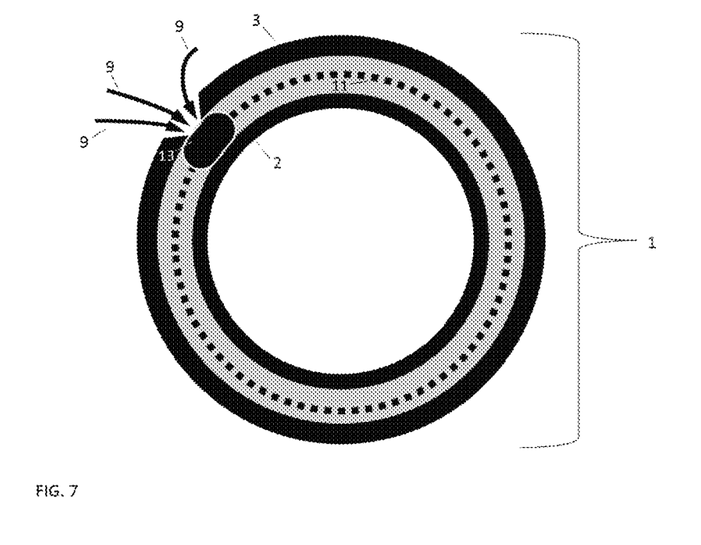
FIG. 7 shows the sealing (or hole-repairing) self-healing material expanding to provide structural support in accordance with aspects of the disclosure.

FIG. 7 shows how, in embodiments, the first SS 13 is operable to further expand within the chamber 5 to additionally be in contact the outer surface of the inner tube 2 to provide increased structural support for the tube structure 1 and the SS 13 at the hole 7 in accordance with aspects of the disclosure. In other words, in embodiments, the SHM is configured such that upon activation, the solidified section 13 expands to occupy a volume of the tube structure. In accordance with further aspects of the disclosure, the SS 13 can provide further structural support to the outer tube 3 when fully expanded and solidified within chamber 5.

Figure 8:
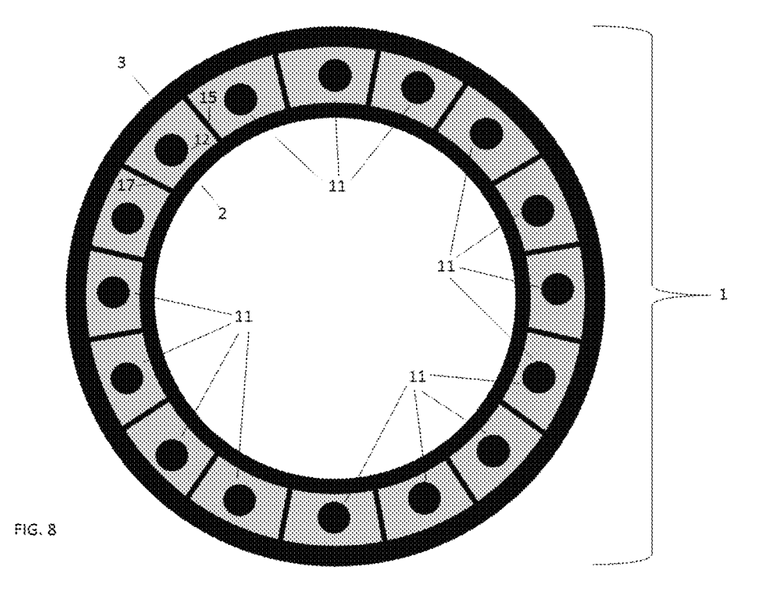
FIG. 8 shows a second exemplary tube comprising a plurality of chamber separators and the self-healing material in accordance with aspects of the disclosure.

FIG. 8 shows a further tube structure configuration comprising a plurality of chamber separators, comprised of at least a first chamber separator (CS) 15 and a second chamber separator (CS) 17. In accordance with aspects of the disclosure, the plurality of chamber separators provides a number of discrete chambers, which compartmentalizes any sustained damage to the tube structure to the affected discrete chamber(s). Additionally, the plurality of chamber separators may act as supports between the inner and outer tubes 2, 3 to maintain the integrity of the chamber 5.

In accordance with aspects of the disclosure, the separators are operable to prevent premature reaction of the SHM 11. For example, if a hole occurs in the outer tube 3, the inflow of fluid through the hole (prior to the formation/expansion of the solidified section) will be constrained by the respective chamber separators. As such, the SHM 11 arranged in other regions of the tube will not be impacted by the inflow of fluid 9, and will not form solidified sections (i.e., will remain unreacted). Accordingly, if a hole subsequently forms in one of these other regions, the SHM 11 in that region (which has not yet been reacted to repair the previously-formed hole) is able to form a solidified section in that region so as to seal the subsequently-formed hole.

Depending on the tube manufacturing process, a plurality of SHM 11 may be, for example, injected, sprayed, arranged, or inserted by any other suitable approach in the chamber 5 within the spaces between the plurality of chamber separators 15, 17 and the inner and outer tubes 2, 3. In other contemplated embodiments, a robot (for example, similar to that disclosed in commonly-assigned application Ser. No. 15/374,230, entitled "Method and System for Forming Laser Beam Weld Lap-Penetration Joints,") may be configured to traverse internal passages (e.g., the chambers formed by the chamber walls) and position, spray, lay, and/or insert the SHM 12. As shown in FIG. 8, the plurality of SHM comprises at least a first SHM 12.

Figure 9:
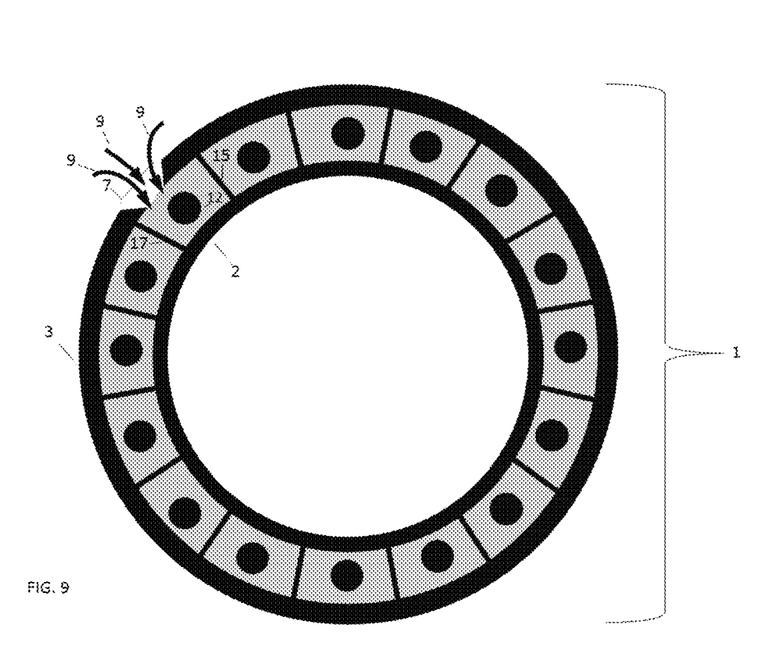
FIG. 9 shows the second tube with the hole in the tube structure and fluid entering the chamber through the hole in accordance with aspects of the disclosure.

FIG. 9 shows the tubular structure 1 with the hole 7 in the outer tube 3. As shown in FIG. 9, the fluid 9 travels through the hole 7 and comes into contact with the first SHM 12, in accordance with aspects of the disclosure.

Figure 10:
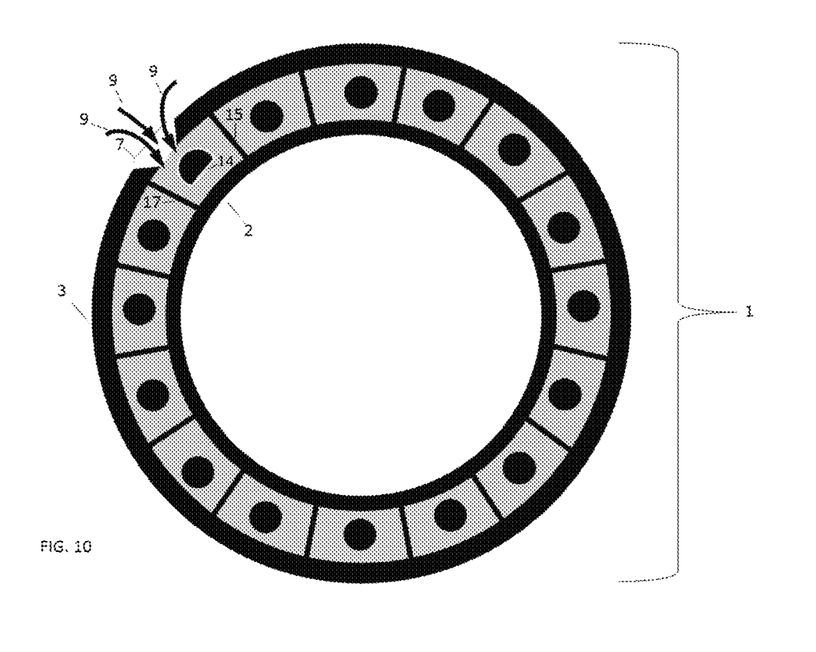
FIG. 10 shows the fluid contacting the self-healing material and the self-healing material reacting to the fluid in accordance with aspects of the disclosure.

FIG. 10 shows the first SHM 12 reacting to the fluid 9 in accordance with aspects of the disclosure. As shown in FIG. 10, upon reacting with the fluid 9, the first SHM 12 is operable to expand and solidify, so as to form a solidified section (SS) 14.

Figure 11:
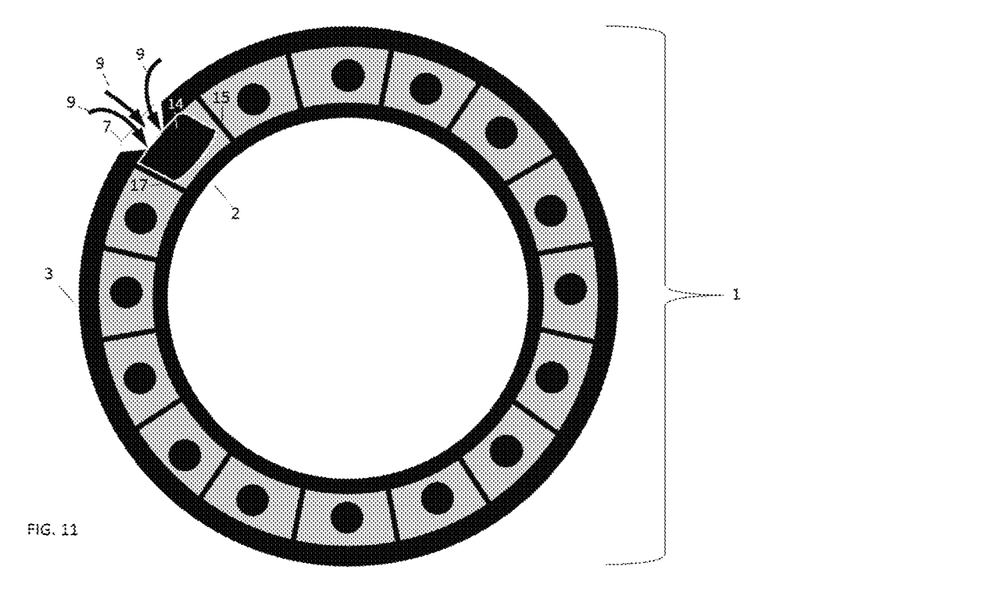
FIG. 11 shows the self-healing material expanding and solidifying to form a vacuum seal in accordance with aspects of the disclosure.

FIG. 11 shows how the SS 14 is operable further expand to fill in and close the hole 7 in the outer tube 3. In accordance with aspects of the disclosure, the SS 14 forms a fluid-tight seal to prevent further fluid 9 from entering the chamber 5.

Figure 12:
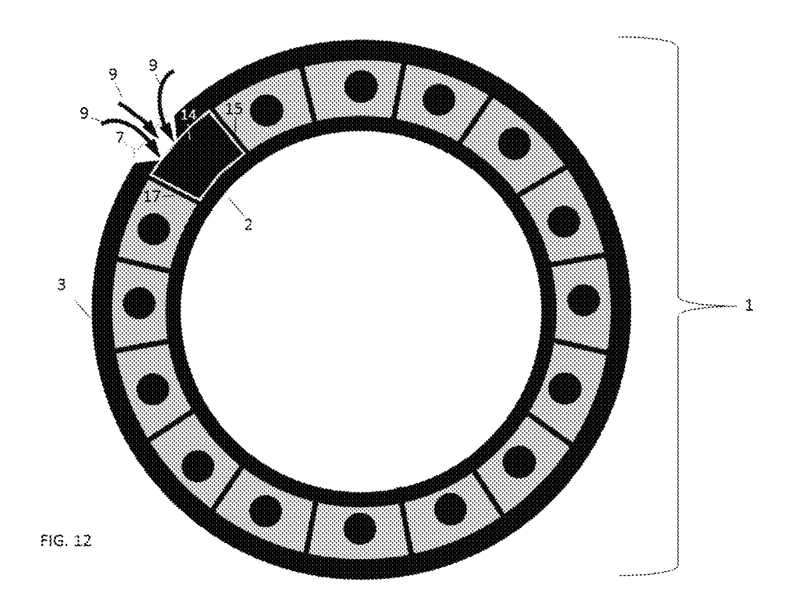
FIG. 12 shows the self-healing material expanding to provide structural support in accordance with aspects of the disclosure.

FIG. 12 shows how the solidified section SS 14 may be configured to continue to expand and fill up an entire area between the hole 7 in the outer tube 3, the first and second chamber separators 15, 17, and the inner tube 2 (at least for a length of the tube sufficient to close the hole 7) in accordance with aspects of the disclosure. In other words, in embodiments, the SHM is configured such that upon activation, the solidified section 14 expands to occupy a volume of a discrete chamber (i.e., an entire cross-sectional area for some length) of the tube structure. In accordance with further aspects of the disclosure, the SS 14 can provide further structural support to the outer tube 3 when fully expanded and solidified within the particular discrete chamber.

While the exemplary embodiment of FIG. 8 depicts how a tube structure 1 may be segmented into discrete chambers around the circumference of the inner tube 2, the disclosure contemplates that the tube structure 1 may additionally (or alternatively) be segmented into discrete chambers along the length tube structure. For example, a tube structure may include a plurality of longitudinal chamber separators within a particular section of the tube structure structured and arranged to provide a plurality of discrete tube chambers along the longitudinal length of the tube section. Alternatively, the disclosure contemplates a particular tube section (e.g., a discrete tube section) having no longitudinal chambers formed therein.

In embodiments, the SHM may be arranged in the chamber prior to the forming of the chamber. That is, for example, the SHM may be secured (e.g., with adhesive) to the outer wall of the inner tube 2, and subsequently, the outer tube 3 may be arranged around the inner tube. In other contemplated embodiments, the SHM may be inserted into the already formed chamber (e.g., for a discrete section of tube). In further embodiments, the SHM may be arranged in the chamber when forming and/or welding the chamber separators.

In embodiments, the SHM may be reactable through contact with the incoming fluid to form the solidified section. For example, the SHM may be configured to react with water. While arranged in the chamber 5, the SHM is maintained in a dry condition. If a hole is formed in the outer tube 3, water enters through the hole, contacts and reacts with the SHM, such that the SHM undergoes, e.g., a chemical reaction, to form the solidified section. In embodiments the SHM may be arranged in the chamber 5 when the tube is manufactured. In such embodiments, the SHM may be covered with a removable protective layer during assembly of the tube structure, and during placement of the tube structure along the tube transportation path. The removable protective layer is structured and arranged to prevent contact between the SHM and the water. After manufacture and assembly, but, for example, prior to the addition of a next tube section, the protective layer can be removed so that the SHM is in a ready-to-be-activated state.

In further embodiments, the SHM may be maintained within an enclosure (e.g., a vessel or a capsule) or under a protective layer that is structured or configured to break and/or open and/or dissolve with contact from the incoming fluid. In other contemplated embodiments, the formation of a hole may cause a shockwave in the chamber that causes the enclosure to break, thus releasing the SHM within the chamber.

In further contemplated embodiments, the SHM may comprise an epoxy-type sealant formed by a reaction of two materials. That is, instead of the SHM reacting with the fluid of the uncontrolled environment to form the solidified section, the disclosure contemplates the fluid of the uncontrolled environment may react with (e.g., dissolve) the enclosure holding the two materials separate from one another, such that these materials are able react with each other to form the solidified section.

It should be understood that while SHM may refer to materials that heal themselves, in the context of the present disclosure, SHM also refer to materials that are operable seal holes in adjacently arranged materials (e.g. the tube wall).

While holes occurring in the inner tube 2 may be of less concern in the context of a high-speed transportation system (as the low-pressure environment would likely be maintained by the outer tube 3), the disclosure contemplates that multiple self-healing materials may be utilized, wherein one self-healing material (SHM) is operable to react with the fluid of the outside uncontrolled environment, and another self-healing material is operable to react with the fluid of the inside controlled environment. In such an embodiment, it may be necessary to maintain a pressure in the chamber 5 at a lower pressure than the controlled environment so that a hole formed in the inner tube will cause a fluid flow from within the controlled environment to the chamber 5. Thus, if a hole developed in the inner tube 2, a fluid from the controlled environment would flow into the chamber 5 and would react with the self-healing material that is operable or configured to react with the fluid of the inside controlled environment. In contrast, if a hole developed in the outer tube 3, a fluid from the uncontrolled environment would flow into the chamber 5 and would react with the self-healing material that is operable or configured to react with the fluid (e.g., seawater or ambient air) of the uncontrolled environment.

Additionally, in embodiments the self-healing material may be configured to seal multiple holes. For example, a projectile may form a hole in both the outer tube and the inner tube, and the self-healing material may be configured and arranged to solidify and/or expand to seal both holes. In further contemplated embodiments, two holes may be formed, for example, in the outer tube, e.g., in close proximity to one another. The self-healing material may be configured and arranged to solidify and/or expand to seal both holes in the outer tube.

While the discussed embodiments include both an inner tube and an outer tube with at least one chamber arranged there between, wherein the self-healing material is arranged in the at least one chamber, the disclosure contemplates the use of a self-healing material with a single tube structure. For example, the self-healing material may be arranged as a coating on an inner wall of the tube. Upon contact with a reacting material (e.g., a foreign fluid entering through a hole in the tube), the coating is operable to solidify and form a solidified section that seals the hole. While the two tube embodiment discussed above may utilize the walls of the inner tube and the outer tube to constrain expansion of the solidified section, with the one tube embodiment, expansion may be less constrainable. As such, with such single tube embodiments the self-healing material may be configured to have a lower rate of expansion.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

While the disclosure has been described with reference to specific embodiments, those skilled in the art will understand that various changes may be made and equivalents may be substituted for elements thereof without departing from the true spirit and scope of the disclosure. While exemplary embodiments are described above, it is not intended that these embodiments describe all possible forms of the embodiments of the disclosure. Rather, the words used in the specification are words of description rather than limitation, and it is understood that various changes may be made without departing from the spirit and scope of the disclosure. In addition, modifications may be made without departing from the essential teachings of the disclosure. Furthermore, the features of various implementing embodiments may be combined to form further embodiments of the disclosure.

While the specification describes particular embodiments of the present disclosure, those of ordinary skill can devise variations of the present disclosure without departing from the inventive concept. For example, while the disclosure refers to tubular structures and depicts circular tubular structures, the disclosure contemplates other (e.g., non-circular) tubular structures, such as oval tubular structures, and/or rectangular tubular structures. Additionally, other "tubular" structures may include other shapes, such as triangular, hexagonal, pentagonal, octagonal, and other "unique" cross-sectional shapes.

Insofar as the description above and the accompanying drawing disclose any additional subject matter that is not within the scope of the claims below, the embodiments are not dedicated to the public and the right to file one or more applications to claim such additional embodiments is reserved.

We claim:

1. A tubular structure comprising:
   an outer tube;
   an inner tube arranged within the outer tube;
   at least one chamber formed between the outer tube and the inner tube; and
   at least one self-healing material arranged in the chamber, wherein the self-healing material is configured to solidify and/or expand upon contact with a reacting material,
   wherein the at least one self-healing material comprises first and second self-healing materials, wherein the first self-healing material is configured to solidify upon contact with a first foreign fluid, and the second self-healing material is configured to solidify upon contact with a second foreign fluid.

2. The tubular structure of claim 1, further comprising at least two chamber separators,
   wherein the at least one chamber comprises a plurality of chambers formed by the at least two chamber separators.

3. The tubular structure of claim 2, wherein the chamber separators extend in a radial direction between the inner tube and the outer tube and extend longitudinally along the inner tube.

4. The tubular structure of claim 2, wherein the chamber separators extend in a radial direction between the inner tube and the outer tube and extend circumferentially along the inner tube.

5. The tubular structure of claim 2, wherein the at least one self-healing material is arranged in discrete portions in each of the plurality of chambers.

6. The tubular structure of claim 1, wherein the reacting material is at least one foreign fluid.

7. The tubular structure of claim 1, wherein the first foreign fluid is external to the outer tube, and wherein the second foreign fluid is internal to the inner tube.

8. The tubular structure of claim 1, wherein the reacting material is arranged in proximity to the self-healing material, while being maintained isolated from the self-healing material by an isolating material.

9. The tubular structure of claim 8, wherein the isolating material is operable to dissolve, degrade, disintegrate, and/or breakdown upon contact with a foreign fluid.

10. The tubular structure of claim 1, wherein the inner tube is concentrically arranged within the outer tube.

11. The tubular structure of claim 1, wherein the at least one self-healing material is structured and arranged to be contacted with a foreign fluid entering the at least one chamber through a hole formed in a wall of the outer tube, and upon the solidification and/or expansion of the self-healing material, forms a solidified section that seals the hole.

12. The tubular structure of claim 11, wherein the at least one self-healing material is configured such that the solidified section formed therefrom expands to contact both the outer tube and the inner tube.

13. The tubular structure of claim 2, wherein the at least one self-healing material is configured such that a solidified section formed therefrom expands to contact both the outer tube and the inner tube and a plurality of chamber separators.

14. The tubular structure of claim 1, wherein the at least one self-healing material is encapsulated in an enclosing material.

15. The tubular structure of claim 1, wherein the at least one self-healing material is structured and arranged to be contacted with a foreign fluid entering the at least one chamber through a hole formed in a wall of the inner tube, and upon the solidification and/or expansion of the self-healing material, forms a solidified section that seals the hole.

16. The tubular structure of claim 1, wherein the self-healing material comprises at least one of polymers, elastomers, metals, ceramics, cementitious materials, and grout materials.

* * * * *